US009386054B2

(12) United States Patent
George

(10) Patent No.: US 9,386,054 B2
(45) Date of Patent: Jul. 5, 2016

(54) SYSTEM AND METHOD FOR COORDINATED SHARING OF MEDIA AMONG WIRELESS COMMUNICATION DEVICES

(75) Inventor: Thomas George, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 12/751,603

(22) Filed: Mar. 31, 2010

(65) Prior Publication Data

US 2010/0255870 A1 Oct. 7, 2010

Related U.S. Application Data

(60) Provisional application No. 61/167,427, filed on Apr. 7, 2009.

(51) Int. Cl.
| | | |
|---|---|---|
| *H04B 7/00* | (2006.01) | |
| *H04L 29/06* | (2006.01) | |
| *H04W 4/10* | (2009.01) | |
| *H04W 76/00* | (2009.01) | |

(52) U.S. Cl.
CPC .............. *H04L 65/4061* (2013.01); *H04W 4/10* (2013.01); *H04W 76/005* (2013.01)

(58) Field of Classification Search
CPC ... H04M 3/562; H04M 3/567; H04M 11/007; H04M 1/72527; H04M 1/7253; H04M 1/72552; H04M 1/72588; H04M 2250/70; H04M 3/085; H04M 3/247; H04M 7/125; H04B 1/202
USPC .................................. 455/517, 518, 519, 41.2
See application file for complete search history.

(56) References Cited

U.S. PATENT DOCUMENTS

| | | | | |
|---|---|---|---|---|
| 2002/0094830 A1* | 7/2002 | Wenzel | ................ | G06K 7/0008 455/517 |
| 2003/0055903 A1* | 3/2003 | Freed | .................... | H04L 12/585 709/206 |
| 2004/0048569 A1* | 3/2004 | Kawamura | ............. | H04L 29/06 455/41.1 |
| 2004/0137930 A1* | 7/2004 | Kim | ..................... | H04L 1/1671 455/517 |
| 2004/0183896 A1 | 9/2004 | Takamine et al. | | |
| 2005/0262374 A1* | 11/2005 | Shinkawa | ............. | G06F 1/3203 713/500 |

(Continued)

FOREIGN PATENT DOCUMENTS

| | | |
|---|---|---|
| CN | 1489389 A | 4/2004 |
| CN | 101120334 A | 2/2008 |

(Continued)

OTHER PUBLICATIONS

International Search Report, PCT/US2010/029790, International Searching Authority, European Patent Office, Jul. 6, 2010.

(Continued)

*Primary Examiner* — Bobbak Safaipour
(74) *Attorney, Agent, or Firm* — Raphael Friewirth

(57) ABSTRACT

A system and method for coordinating the sharing of media among wireless devices is disclosed. An originating wireless communication device sends to at least one target wireless communication device media on a media channel and at least one command on how to use the media on a command channel. These send operations can be performed synchronously or asynchronously. Each target wireless communication device, upon receiving both signals, executes the command on the media.

58 Claims, 8 Drawing Sheets

(56) References Cited

U.S. PATENT DOCUMENTS

| | | | |
|---|---|---|---|
| 2006/0101116 A1* | 5/2006 | Rittman | H04L 12/1813 709/204 |
| 2006/0172747 A1 | 8/2006 | Mohammed | |
| 2006/0178160 A1* | 8/2006 | Hans | H04L 29/06027 455/518 |
| 2006/0179182 A1* | 8/2006 | Chadha | G06F 13/4059 710/29 |
| 2006/0190559 A1 | 8/2006 | Lim | |
| 2007/0054686 A1* | 3/2007 | Allen | H04W 76/005 455/518 |
| 2008/0051124 A1* | 2/2008 | Shaffer | H04W 72/005 455/518 |
| 2008/0064373 A1 | 3/2008 | Lessing | |
| 2008/0275937 A1 | 11/2008 | Nishiki | |
| 2008/0299908 A1* | 12/2008 | Tanada | G08C 17/02 455/41.3 |
| 2009/0036056 A1* | 2/2009 | Oshima | H04M 1/7253 455/41.3 |
| 2009/0089465 A1* | 4/2009 | Douglas | G06F 3/1454 710/65 |
| 2009/0177699 A1* | 7/2009 | Rosenblatt | G06F 21/6218 |
| 2009/0244311 A1* | 10/2009 | Eom | H04N 5/23293 348/222.1 |
| 2009/0288131 A1* | 11/2009 | Kandekar | G06F 17/30029 725/133 |
| 2010/0131844 A1* | 5/2010 | Wohlert | G06F 17/30029 715/716 |
| 2010/0202761 A1 | 8/2010 | Bhogal et al. | |
| 2010/0255870 A1* | 10/2010 | George | H04W 4/10 455/518 |
| 2010/0268761 A1* | 10/2010 | Masson | H04L 65/4084 709/203 |
| 2011/0201375 A1* | 8/2011 | Gill | H04L 12/189 455/518 |
| 2012/0226817 A1* | 9/2012 | Woxblom | H04L 12/2809 709/231 |
| 2012/0254755 A1* | 10/2012 | Wohlert | G06F 17/30053 715/716 |

FOREIGN PATENT DOCUMENTS

| | | |
|---|---|---|
| CN | 101277160 A | 10/2008 |
| EP | 1672940 A1 * | 6/2006 |
| EP | 1694044 | 8/2006 |
| EP | 1887751 | 2/2008 |
| EP | 2101147 A1 | 9/2009 |
| JP | H05336517 A | 12/1993 |
| JP | 2002026987 A | 1/2002 |
| JP | 2004187126 A | 7/2004 |
| JP | 2004190489 A | 7/2004 |
| JP | 2004259263 A | 9/2004 |
| JP | 2005191786 A | 7/2005 |
| JP | 2005347857 A | 12/2005 |
| JP | 2007514228 A | 5/2007 |
| JP | 2008042667 A | 2/2008 |
| JP | 2008167351 A | 7/2008 |
| JP | 2008276387 A | 11/2008 |
| JP | 2012504728 A | 2/2012 |
| KR | 20040048347 A | 6/2004 |
| KR | 20070111489 A | 11/2007 |
| WO | 2005062569 A1 | 7/2005 |
| WO | 2006074099 A2 | 7/2006 |
| WO | 2008069225 A1 | 6/2008 |

OTHER PUBLICATIONS

Written Opinion, PCT/US2010/029790, International Searching Authority, European Patent Office, Jul. 6, 2010.

* cited by examiner

SYSTEM AND METHOD FOR COORDINATED SHARING OF MEDIA AMONG WIRELESS COMMUNICATION DEVICES

CLAIM OF PRIORITY UNDER 35 U.S.C. §119

The present application for patent claims priority to Provisional Application No. 61/167,427, entitled "SYSTEM AND METHOD FOR COORDINATED SHARING OF MEDIA AMONG WIRELESS COMMUNICATION DEVICES", filed Apr. 7, 2009, which is assigned to the assignee hereof and hereby expressly incorporated by reference herein in its entirety.

BACKGROUND OF THE INVENTION

1. Field of the Invention

The present invention relates to point-to-point or point-to-multipoint wireless communications systems. More specifically, the present invention relates to systems and methods for the coordination of the sharing of a sequence of images or other media among users of wireless communication devices.

2. Description of the Related Art

In wireless telecommunication devices, such as cellular phones, PDAs, mini-laptops, and advanced pagers, the devices typically communicate over long distances by bridging telephone calls through existing cellular telephone networks and passing data packets across the network. These wireless devices have limited to significant data processing and computing capability, and can accordingly send and receive data, in addition to voice, across the telephone network.

There exists a wireless telecommunication service that provides a quick one-to-one or one-to-many communication that is generically referred to as "Push to Talk", PTT (which can be push-to-talk over cellular "PTT PoC") capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking Once the speaker releases the PTT button, any other individual member of the group can engage their PTT button and they will have the floor.

PTT systems allow for a voice communications connection to be established in a very short amount of time in a half-duplex channel, but the sending of non-voice data through the channel can be problematic as the size of data is variable and large data can choke the channel and stall communications. Furthermore, because the PTT system allows for one-to-many communications, a stall in data transmission can hinder group communications.

There exists a wireless telecommunications service that provides for a way for a user to send an image, video, audio or other media to a second user. In a typical use, such as via a protocol like multimedia messaging system ("MMS"), the media is sent to a wireless communications device, and then the sender has no way of controlling how the media is used. In such a use, normally, the first user selects the media to send and the recipient of the media and determines when the media is sent by virtue of when that user manually chooses to send the message. When the media arrives at the wireless telecommunications device of the second user, the first user no longer has control over the media. The media may sit on the second user's wireless communications indefinitely, or the second user may choose to view the media in a variety of ways.

There also exists a way of sending media for intentional sequential view by a user of a wireless communication device, such as a "slide-show" of images. In such a system, the data is streamed continuously to the user's device, which decodes the stream and displays the image series transmitted by the first user. While the existent system allows for a plurality of images to be displayed, it is not efficient for use in a resource-constrained wireless interface.

It is desirous to provide a system and method that can address a situation where there are a group of people linked by wireless communication devices, and a user wishing to share a set of media, like a slide-show, with the group and control the actions of the media at the recipient devices.

SUMMARY

In an embodiment, a network communication entity controls the use of media across a wireless communications service. The network communications entity may send, to at least one wireless communications device, media across a data communications channel. The network communications may further send, to each wireless communications device, a command across a control communications channel comprising at least one instruction for the handling of the media by the wireless communication device. The network communication entity may be an originating wireless communication device.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
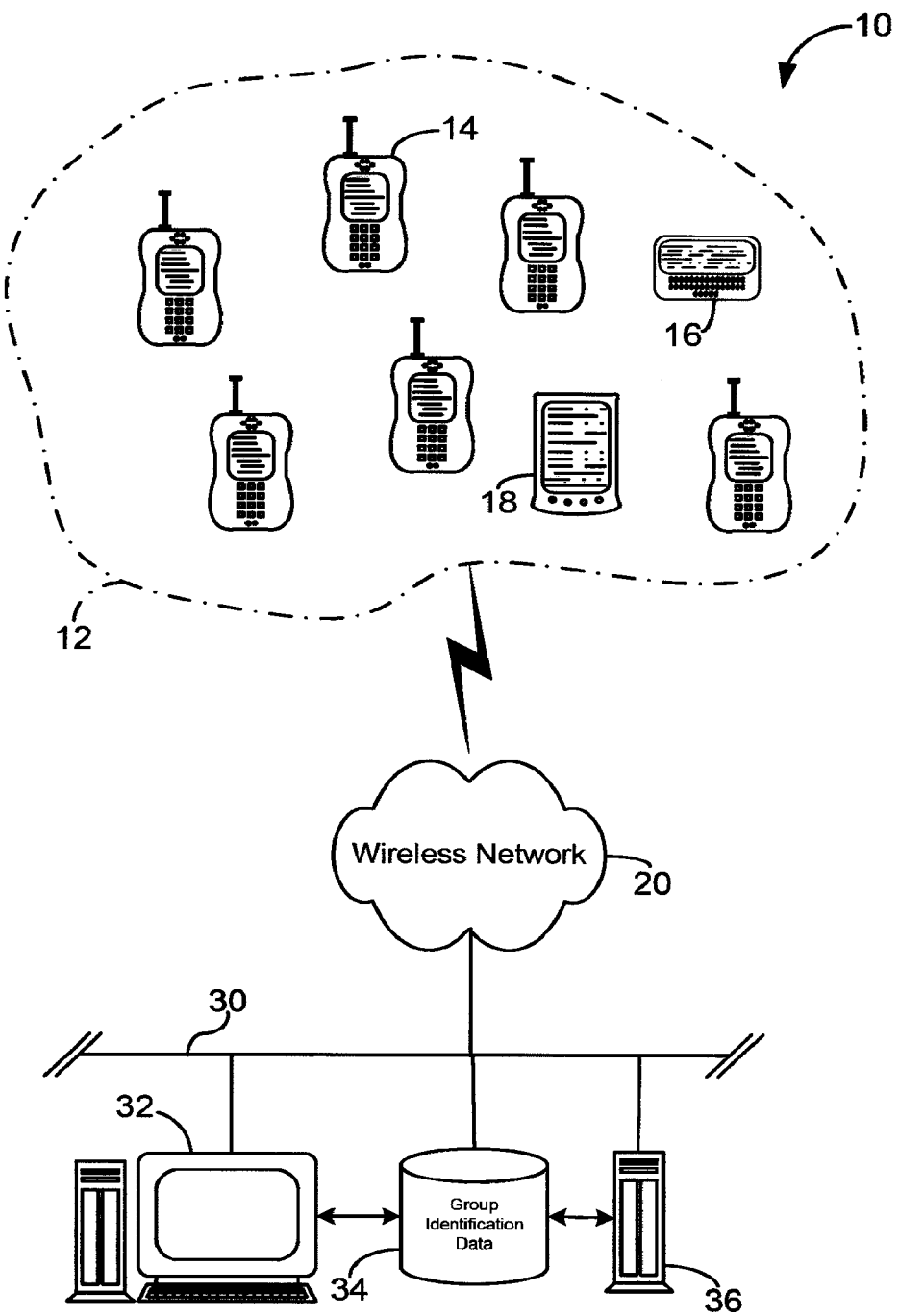
FIG. 1 is a representative diagram of a wireless network with a designated PTT group of wireless telecommunication devices communicating with a group communication server and other computer devices across the wireless network.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "group communication" can be a point-to-point or point-to-multipoint performed over a half-duplex communication channel, either in true half-duplex or virtual half-duplex mode. A "communication channel" can be a dedicated bandwidth channel or can be a virtual channel established within a communication path, such as a packet-switched channel. The terms "originator" and "sender" mean the wireless device that is sending or transmitting voice and/or data intended to be received at one or more other wireless devices, and the term "target" or "receiver" means the wireless device that receives transmitted voice and/or data.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

With reference to the figures in which like numerals represent like elements throughout, FIG. 1 illustrates one embodiment of the system 10 for sharing group media among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) can send a flag, or otherwise notify, at least, the group communication computer device, shown here as server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share is with other computer devices resident on the server-side LAN 30 or accessible across the wireless network 20. The group communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14, 16, 18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and may perform all storage functions described herein.

In overview, the system 10 includes at least one wireless communication device, such as mobile telephone 14, that is a member of a communication group 12 of wireless communication devices that communicate with each other in direct group communications across a wireless communication network 20, the at least one wireless communication device configured to selectively send group-directed media to other members of the communication group 12. At least one group communication computer device 32 is configured to store information on communication groups 12 on the wireless communication network 20, the information including the identity of the specific member wireless communication devices of one or more communication groups. The group communication computer device 32 is further configured to selectively receive group-directed media from a sending wireless communication device, such as mobile telephone 14, of a communication group 12 and send the group-directed media to the other member wireless communication devices of the communication group 12 for the sending wireless communication device.

The system 10 can further include a data store 36 in communication with the group communication computer device(s) 32, with the group communication computer device 32 configured to send group-directed media to the data store 36, as is further described herein. The data store 36 configured to receive the group-designated media from the wireless communication device (such as mobile phone 14) and selectively permit members of the communication group 12 for which the group-directed media was sent to access the stored group-directed media across the wireless communication network 20.

The group-directed media can be graphic media, such as pictures in JPEG, TIF, and the like, audio files such as MP3, MP4, WAV, and the like. The group-directed media can also be streaming media, such as a multimedia application (POWER POINT™, MOV file, and the like). The group-directed media can also be an interactive session on another computer device on the wireless communication network 20, such as a game hosted on data store 36 or private bulletin board. For example, participants in a game can chat via the group-communication about the ongoing game. Also, the group-directed media could be a form of half-duplex communication among members of the communication group wherein the picture of the speaker is broadcast to the other group members in substantial real-time, or in delay.

The size of these media files can be very large, and because of the potential delay of sending the media, or inability of the receiving wireless communication device to handle the sent media, the system 10 can use a data store 36 (or file management server or other computer device) to store the group-directed media such that target members of the communication group 12 can selectively access the stored media without interrupting other PTT communications, or can be send the media in a delayed fashion. The data store 36 can be configured to automatically send the group-directed media to each of the member wireless devices of the communication group 12 upon establishing a communication link therewith. Upon receipt of the group-directed media by at least one of the member wireless devices of the communication group, the group communication computer device 32 can send to the originating wireless communication device 14,16,18 which sent the group-directed media, an acknowledgement that at least one member wireless communication device of the communication group 12 received the group-directed media.

The wireless communication device 14, 16, 18 can send communication group identification data to the group communication computer device 32 at the time of requesting the group-directed media to be sent, e.g. send a target list, and thus, the group communication device 32 may send or store the group-directed media to the member wireless communication devices identified in the communication group identification data based upon a variety of criteria as is further discussed herein. Alternately, prior to the wireless communication device sending group-directed media, the wireless communication device 14,16,18 can request member data for a communication group 12 from the group communication computer device 32, and the group communication computer device 32 can send one or more addresses or communication group addresses to the wireless communication device 14,16, 18. In one embodiment, the communication group computer device 32 can filter the potential communication groups available based upon their member devices' capability to received group-directed media.

As is further described herein, the wireless communication device 14,16,18 can be engaged in a group communication with the member wireless communication devices of the communication group 12, and send group-directed media during the group communication in the same communication session, or independently therefrom. Alternately, the group-directed media can be sent independently of the group-communication session and through one or more other communication channels, either half or full duplex.

Figure 2:
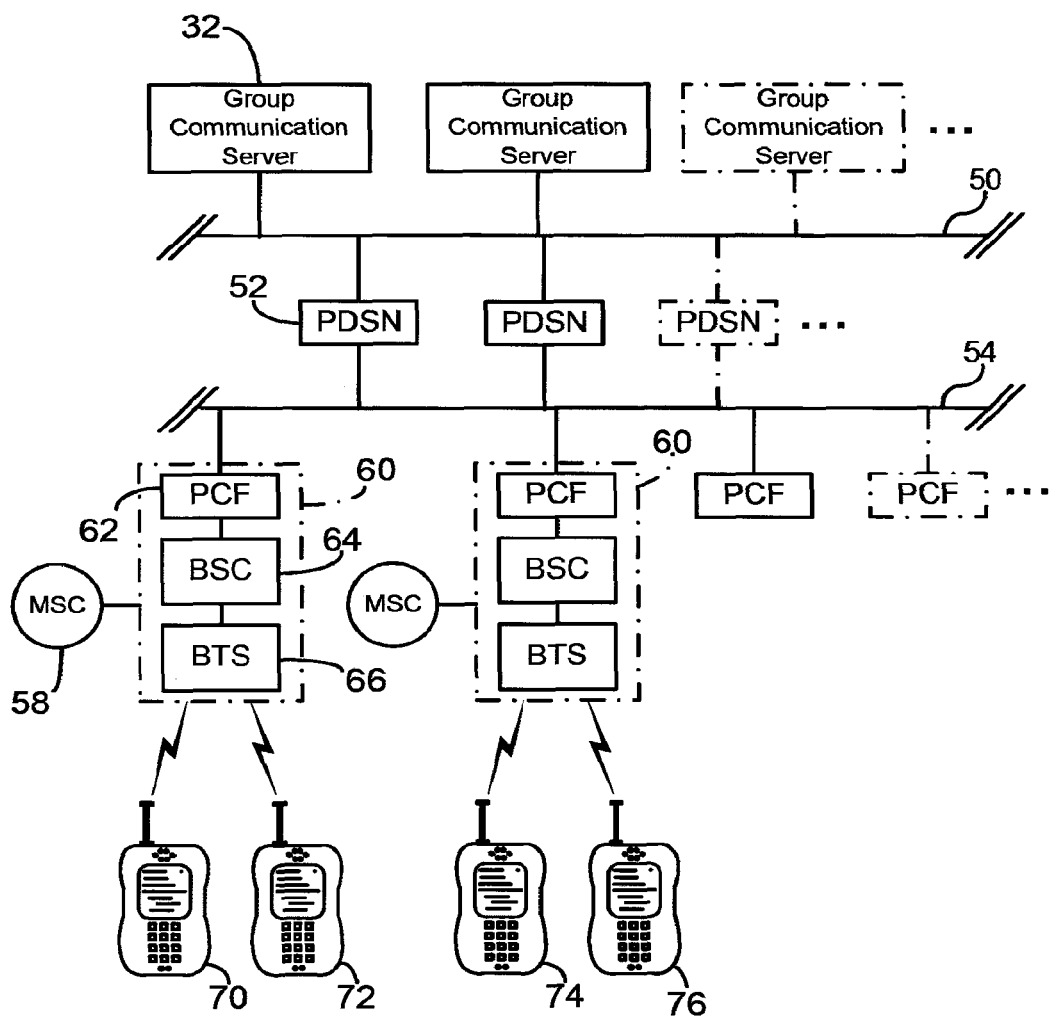
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service provider's packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network 54, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or at the control of, the group communication computer device 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
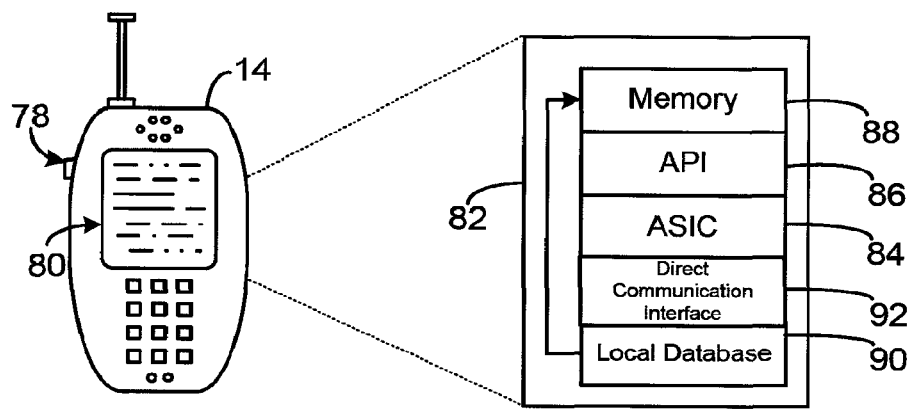
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
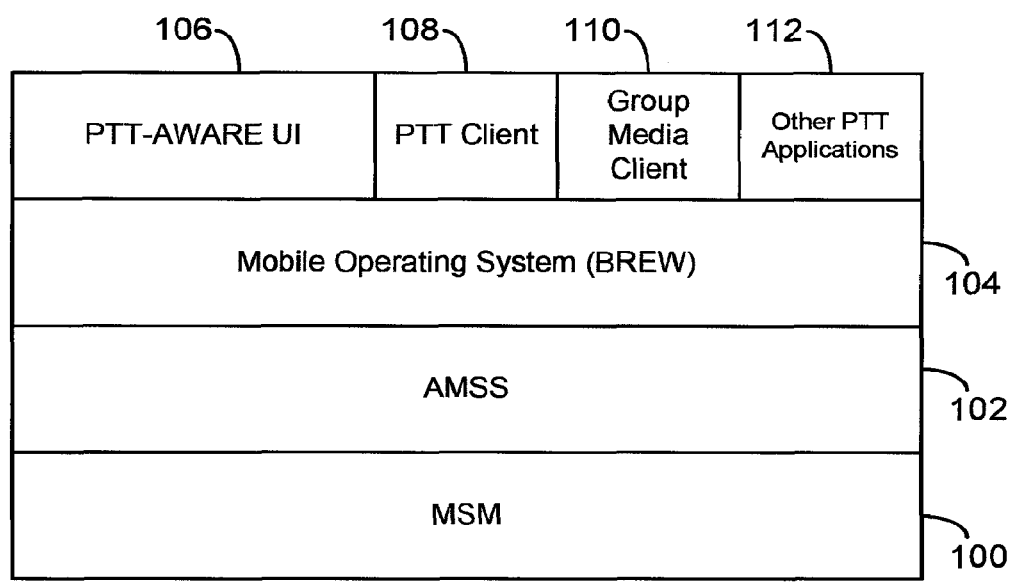
FIG. 4 is a diagram of one embodiment of the software layers of the communication group application, with a PTT client and a group-directed media client.

FIG. 4 is a diagram of one embodiment of the software layers of the group application client, with a PTT facility and a group-directed media facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM. The mobile operating system layer 104 application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the Group Media Client 110. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

In an embodiment, the Group Media Client 110 is a mobile operating system-based application that extends PTT services for access to media types other than the traditional half duplex voice communications (VoIP-PTT media). The Group Media Client 110 provides access to group-media services through an external interface, in one embodiment being a separate API, such as a Group Media Aware API. The Group Media Aware UI is an application that may be developed entirely as a mobile operating system-based application or used in combination with an AMSS 102 interface. The Group Media Aware UI responds to user requests for group-directed media services by invoking the appropriate APIs, such as those from other resident PTT and group media applications 112. The Group Media Client 110 services the requests from the user and informs the user the result of any group-directed media request. The user can also have setting on the Group Media Client 110, that specify how to handle an incoming notification that indicates there is a file to be downloaded from the file management server (data store 36). For example, the Group Media Client 110 can elect to have the file download commence immediately or to allow the target user to be prompted to determine whether to download the file. In another embodiment, a singular client interface may provide both PTT and Group Media access service.

Figure 5:
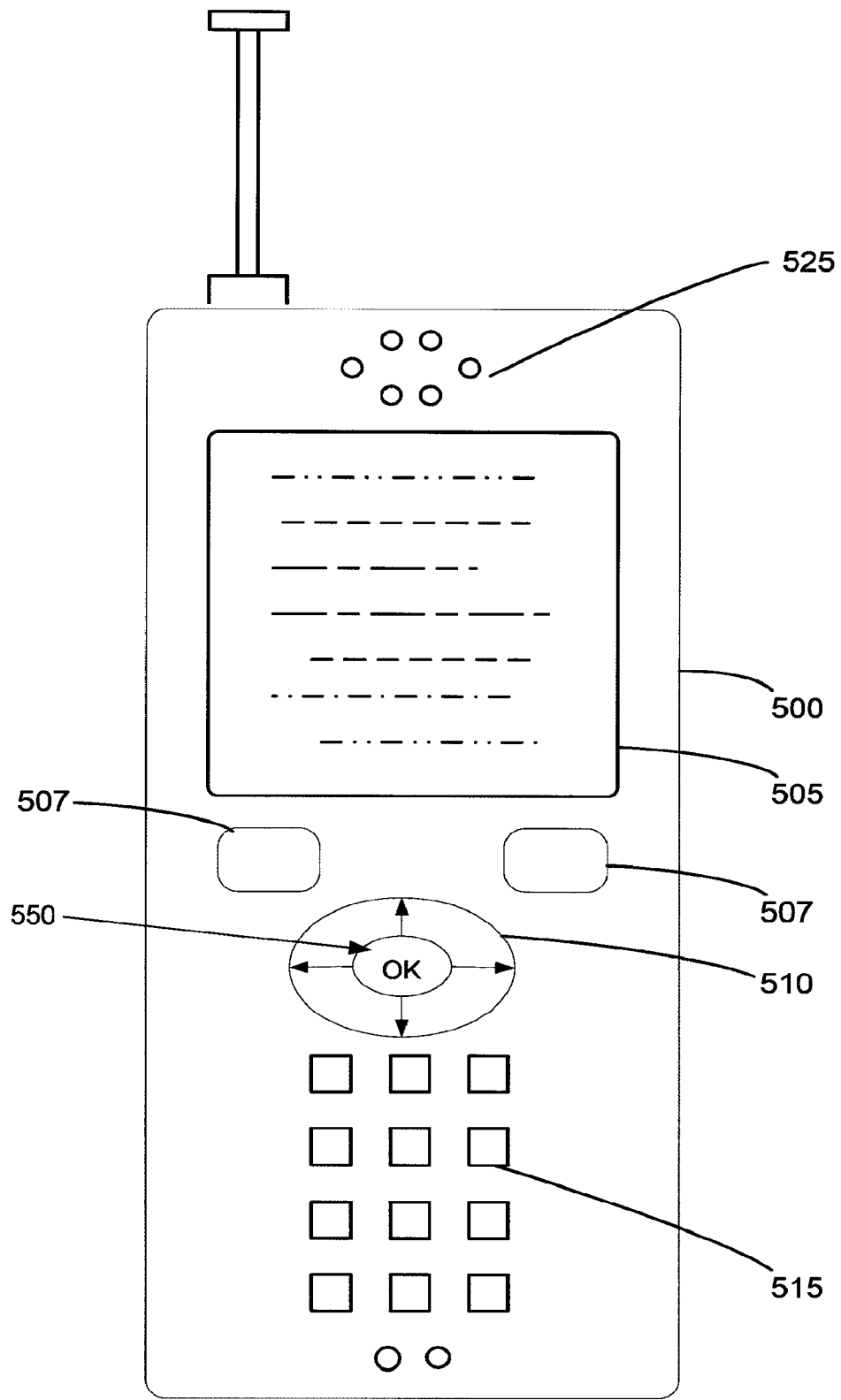
FIG. 5 is an exemplary mobile communications device.

Referring to FIG. 5, illustrated is an exemplary mobile communication device 500, and in particular, the user interface for the device. The device typically includes a display 505 that may comprise an LCD or OLED display. In some embodiments, the display may include touch screen capability. The device may include a keypad 515 that may be a standard phone keypad, or in other embodiments a QWERTY keypad. The device may also include navigation buttons 510 that may further comprise up, down, left, and right keys for navigating through the display 505. The navigation keys may further comprise a selection or OK key 550 to indicate the user's selection or acknowledgment of a particular function. The device may also include soft keys 507 that are programmable and used to select the function as indicated in an area of display 505 near the soft key.

In one embodiment, Referring to FIG. 5, in one embodiment the device is a mobile telephone, with illuminated buttons on keypad 515, navigation buttons 510, or OK key 550. The button(s) may illuminate steady in a particular color, or may flash on/off, or in any other manner as configured in the device or by the user. Additionally and optionally, the device may provide an indication of recording on display 505. The mobile communications device may further provide an aural indication such as a periodic tone, or provide other indications that may be configured by the user on the device.

Figure 6:
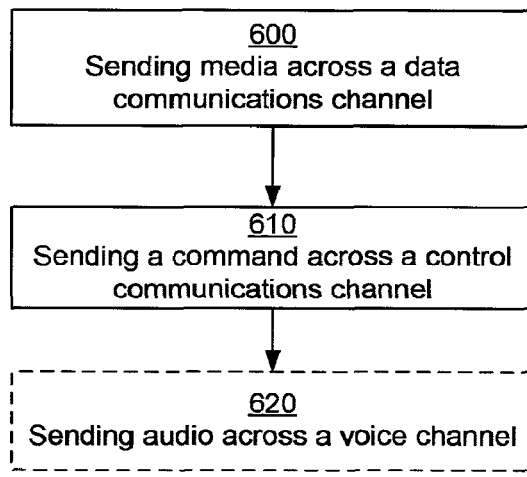
FIG. 6 depicts an exemplary process incorporating some of the embodiments disclosed herein.

FIG. 6 depicts an exemplary process incorporating some of the embodiments of coordinated sharing of media among a plurality of mobile communications devices disclosed herein. Where it is stated that a sending or originating mobile device performs a step, there is frequently a receiving mobile device that receives a communication and performs a corresponding step.

In an embodiment, the process begins with sending, to at least one wireless communications device 12, media across a data communications channel (600). The media may comprise at least one picture image, audio sound, video, or slideshow presentation. As will be discussed in more detail below, one or more commands may be sent, to at least one wireless communications device 12, across a control communications channel (610). In an embodiment, the media transfer across the data communications channel may be performed at the same time as sending, to each wireless communications device, audio across a voice channel while sending the media (620). In an embodiment, communications between mobile devices are sent through an application server, or a packet data serving node ("PDSN"). A PDSN acts as a connection point between cellular communications networks and internet protocol ("IP") networks.

In an embodiment, the media may be stored on a server, and sending media includes directing the server to send the media to each wireless communications device. In an embodiment, the media that the originator wishes to send may be located on the sender's wireless device. Here, the sender transmits the media from the wireless device through a server and to the recipient. In another embodiment, the media may be located remotely. In an embodiment, the media may be located on that server, and the sender transmits a request to the server to send the media to the recipient. In an embodiment, the media may be located on a server separate from the server that processes the sender's communications with the recipient. In that embodiment, the sender's message comprises an instruction for the communications server to retrieve the media from the media server. In another embodiment, the mobile devices may utilize a point-to-point method of communicating, and signals may be sent directly between phones.

In an embodiment, the sender and each recipient's mobile device "handshake" to establish communications. In an embodiment, this may be done either directly between mobile devices or through a server as an intermediary. In an embodiment, the handshake may be the initial send of the media. If that handshake is accepted by the recipient, the sender can be assured that the recipient has both the sent media and the application required to use the media.

In an embodiment, the voice channel may not be established between the sender and each recipient. In this case, all communications may be made via "Data over Signaling" ("Dos"), or some other similar signaling mechanism, where data is sent over a signaling channel instead of a voice or "bearer" channel.

In an embodiment, a half-duplex channel may be used. A half-duplex channel is one where communications may take place in only a single direction at a time, and one must have the "floor" to communicate. In an embodiment, the user who has the voice floor and the communications floor is the person who has the right to talk, send media and perform any associated commands available with floor control.

In an embodiment, the user who has the voice floor is not the person who has the communications floor, and that user can only talk. Another user that has the communications floor has the right to send media and associated commands, including those particularly for the coordination of media sharing.

In an embodiment, the user who has the voice floor is not the person who has the communications floor, and that user can only talk. Another user that has the communications floor has the right to send media. Yet another user may have the right to send associated commands, including those particularly for the coordination of media sharing.

In an embodiment, the user who has the right to send associated commands to control the media maybe an automated program on a server.

In an embodiment, a full-duplex channel may be used. In such an embodiment, communications may take place in both directions (a mobile device may send and receive) simultaneously. In an embodiment under a full-duplex system, any party to the voice communications may send media and associated commands.

Again referring to FIG. 6, in an embodiment, the next operational step comprises sending, to each wireless communications device, a command across a control communications channel comprising at least one instruction for handling the media (610). In an embodiment where there exists a plurality of recipient wireless communications devices, a command can comprise at least one instruction for each wireless communications device to handle the media at the same time. In an embodiment, communications across the control channel may be prioritized by the recipient, so that those commands are carried out as quickly as possible.

Where a significant amount of media data needs to be sent, the sender may send it before he or she desires to present it and that media may be stored on each recipient's mobile device. Then, when the sender wishes to present the media, he need only send the commands on how to present it, and with the data already in hand, the recipients may follow those commands without delay.

In an embodiment, the sender sends a plurality of images to at least one recipient. If the sender wishes for the recipient to see the first image, then the second, the third, and the first again, the sender may achieve this second display of the first image through a command only, and does not need to resend the first image again. This is in contrast to prior systems where a sender would need to re-send the first image in order for it to be displayed a second time.

In an embodiment wherein each wireless communications device has set an internal clock from a time server and an instruction for each wireless communications device to handle the media at the same time includes an instruction to handle the media when the internal clock reaches a specified time.

In an embodiment, the instruction for handling the media comprises at least one from the set comprising a time to begin presenting the media, a time to end presenting the media, an instruction to replace the media with a second media, an instruction to delete the media, an instruction to store the media, and an application to use to present the media. In an embodiment, the time to begin presenting the media may be an absolute time (e.g. "September 5 at 22:00 hours GMT") or a relative time (e.g. "35 seconds from now").

In an embodiment, the command further comprises an application to use to present the media. In an embodiment, the recipient already has the application. In an embodiment, the recipient may then download the application from a network. In an embodiment, the command contains the application itself. In an embodiment, the application to be used may be an application that may execute on a runtime environment, such as QUALCOMM's™ BREW™ (BINARY RUNTIME ENVIRONMENT FOR WINDOWS™). BREW is a software platform that can download and run small programs for playing games, sending messages, sharing photos, etc. BREW runs between the application and the wireless device's chip operating system so as to enable a programmer to develop applications without needing to code for system interface or understand wireless applications.

In an embodiment wherein the media comprises at least one from the set comprising video and audio, wherein the instruction comprises at least one from the set comprising a instruction to play the media in slow motion, an instruction to rewind the media, an instruction to fast-forward through the media, an instruction to loop a subset of the media, and an instruction to jump to a new part in the media. In an embodiment, the sender may be sending a slideshow presentation to the recipients. In an embodiment, each slide is represented as an image. Here, commands may be issued to move forward or backward through the slides, put an effect on the transition to another slide, such as a dissolve, or change to the next slide every specified period of time, or move to the first or last slide in the presentation.

In an embodiment, wherein at least one wireless communications device comprises a target wireless communications device, the command further comprises at least one instruction for only each target wireless communications device to process at least one instruction for handling the media. For instance, where a sender is communicating with three recipients, he or she may issue a command that includes with it an instruction that only a specified two of the three are to process the command. In an embodiment, that command is sent only to the intended recipients. In an embodiment, the sender's mobile device has an interface that allows the sender to select or create a subgroup and the messages are discriminated by the sender's mobile device based on the target name of each recipient's mobile device.

In an embodiment, the data communications channel and the control communications channel are logical channels that share a common underlying channel. In an embodiment, the mobile devices use the evolution-data optimized ("EV-DO," "EVDO," "EV," "evolution-data optimized") standard for transmitting data. EVDO uses multiplexing techniques including code division multiple access ("CDMA") and time division multiple access ("TDMA") to multiplex a single channel. Where the media and control channels are multiplexed onto a single channel, techniques such as CDMA and TDMA may be employed to affect this.

In an embodiment, the procedure includes the optional operational step of sending audio across a voice channel. The method can also include the steps of sending, to each wireless communications device, a request to initiate a phone call; receiving, from at least one unanswering wireless communications device, an indication that the call is declined; sending, to each unanswering wireless communications device, a second media across the data communications channel; and sending, to each unanswering wireless communications device, a second command across a control communications channel comprising an at least one instruction for handling the media.

In an embodiment, the sender attempts to establish voice communications with the recipient across the voice channel, and sends an image file across the media channel, and an instruction to display the image across the command channel. If the recipient does not answer the call, upon receiving notification of that, the sender's wireless device sends an instruction to stop displaying the image. In an embodiment, instead of sending an instruction to stop displaying the image, the sender sends an instruction to display a second image. For instance, the sender may send a photo of him smiling when he initiates the voice call (a "rich call initiation"), and a photo of him frowning when the call is not answered (where the call is not answered the traffic or voice channel is never opened). "Smiley" and "frowny" face icons could also be used. Or, the sender may send a photo of himself, but not wish for that photo to remain on the device if no one answers, since that may be indicative of the device being lost. In that case, if the call is not answered, the sender would send a command to the recipient to delete the image. Alternatively, the sender may send a command to halt displaying the image and move it to a folder on the recipient's mobile device.

In an embodiment, the sender may wish to send a photo of the restaurant he is currently at along with an invitation for the recipient to meet him there. If the recipient does not answer by the time the sender is finished at the restaurant, the sender may push out a picture of the theater he is now at, along with a command to delete the restaurant picture and display the theater picture.

Figure 7:
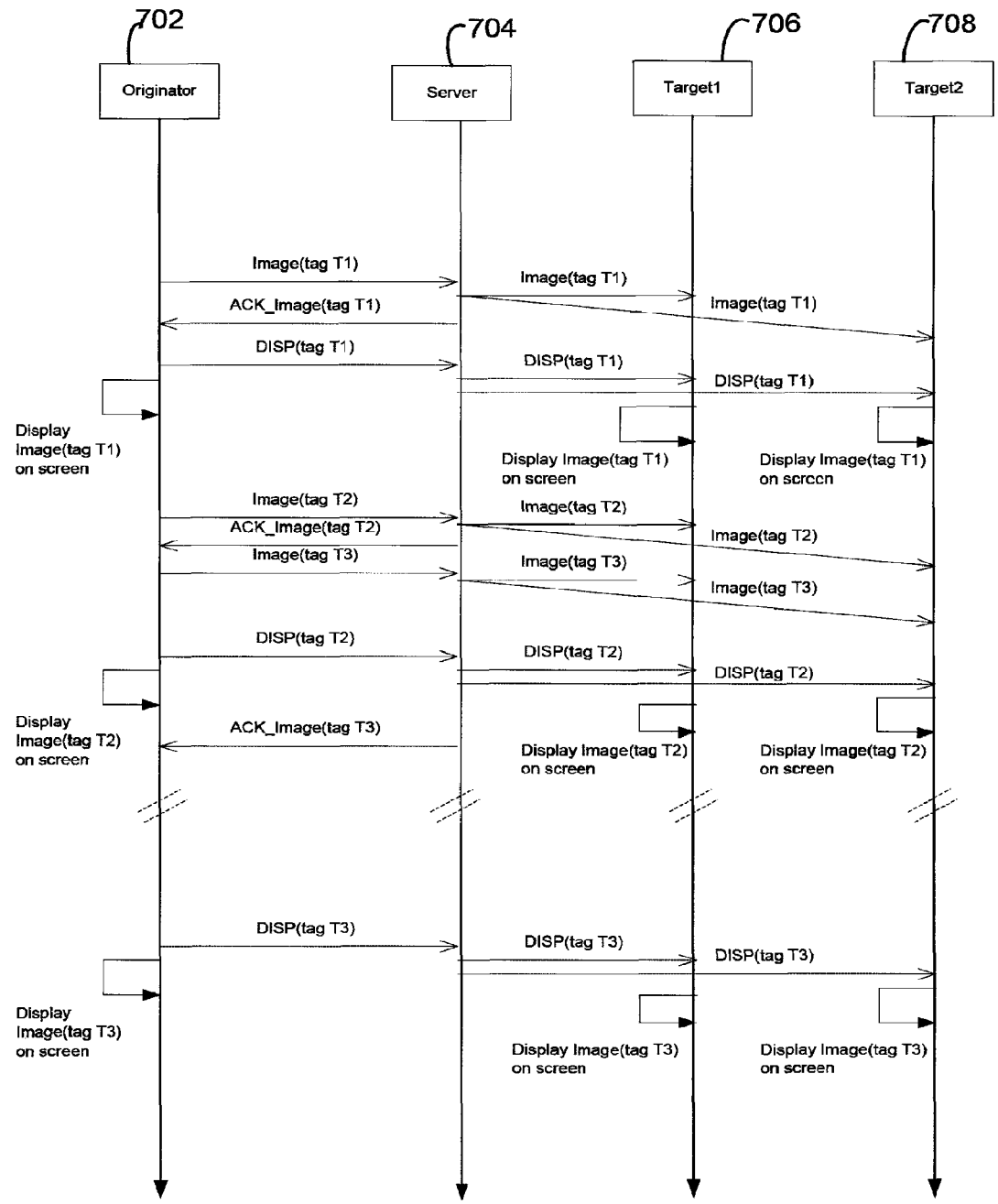
FIG. 7 is a call-flow diagram of one embodiment of the system comprising a coordinated sharing of media among a plurality of mobile communications devices.

FIG. 7 is a call-flow diagram of one embodiment of the system comprising a coordinated sharing of media among a plurality of mobile communications devices. Time proceeds from the top of the page towards the bottom of the page, so, for instance, the "Image(tag T1)" message (this format may be read to say "send the image media with corresponding unique tag 'T1' to recipient 1 and recipient 2") is sent before the "ACK_Image(tag T1)" message is sent. In other embodiments, some of these messages may be sent in a different order. For instance, in an embodiment, the server 704 may send the "ACK_Image(tag T1)" message to the originator 702 before sending the "Image(tag T1)" message to target 1 and target 2.

A sender, or originator 702, begins by sending an "Image (tag T1)" message to a server 704. In an embodiment, each media comprises a separate message. In an embodiment, the message may be sent across a data channel. In an embodiment, a plurality of image media, each sent in a separate message may comprise a slideshow presentation, such as a POWERPOINT™ presentation. In an embodiment, the server 704 comprises a QCHAT™ server or a PSDN. The message represents a request for the server to send that message to both recipient 1, or target 1, 706 and recipient 2, or target 2, 708. The server 704 then sends the "Image(tag T1)" message to both recipient 1 and recipient 2, and also sends an "ACK_Image(tag T1)" message to the sender 702 indicating that the server 704 received the sender's first message. In an embodiment, each recipient 706, 708 stores both the image and the associated unique tag, so that later received messages may reference the image via the unique tag.

The sender 702 then sends a "DISP(tag T1)" message indicating that the media associated with tag "T1" is to be displayed on the wireless device of each recipient. In an embodiment, all of these commands to display or otherwise instruct the usage of the media may be sent via a control channel. In an embodiment, the sender 702 may use a multicast channel to transmit media (that is, the media is broadcast to all users of a group) and a unicast channel to transmit commands (that is, the command is sent to a single user of a group, or a subset; a multicast channel may also be used for the commands and a unicast channel may also be used for the media). When the server 704 receives the message, it forwards it to each target 706, 708. The sender 702 and each target 706, 708 then display the image associated with tag "T1" on the screen of the wireless device. "DISP(tag T1)" is a command that instructs each recipient device on how to process the media associated with unique tag "T1." Other commands may comprise an instruction to delete a corresponding media from the recipient wireless device, or an instruction for only a specified subset of recipients to process a command. An advantage of the unique tag becomes apparent regarding the command to delete a corresponding media. In an embodiment, a malicious sender may try to send commands to delete media that he or she did not send or lacks privileges to modify, but cannot do this without the corresponding unique tag, which he or she would have only if he or she originally sent the media and corresponding unique tag.

Where the sender 702 wishes to send additional images to the targets 706, 708, it sends an "Image(tag T2)" and "Image (tag T3)" message to the server 704, which forwards them to the recipients 706, 708 in a manner similar to how the "Image (tag T3)" message was processed. The server 704 also sends an "ACK_Image(tag t2)" message to the sender 702 to indicate that the "Image(tag T2)" message was received and an "ACK_Image(tag t3)" message to the sender 702 to indicate that the "Image(tag T3)" message was received.

When the sender 702 receives the "ACK_Image(tag t2)" it may send a "DISP(tag T2)" message to the server, which will send it to the recipients 706, 708. In the present embodiment, the sender 702 is unsure whether all recipients have received the "Image(tag T2)" because corresponding "ACK_Image (tag T2)" messages are not sent from the recipients to the sender. In an embodiment, the sender 702 may still send a "DISP(tag T2)" message to each recipient, and a recipient that did not receive the "Image(tag T2)" message will ignore the "DISP(tag T2)" message. In another embodiment, the recipient that did not receive the "Image(tag T2)" message will notify the user of an error upon receiving the "DISP(tag T2)" message, for example by displaying an error message on the recipient's wireless device's screen. In an embodiment, the sender 702 receives notification of when or whether a message was received by each recipient 706, 708. Each recipient that receives the "DISP(tag T2)" message that is forwarded from the sender by the server displays the image associated with tag T2 on the wireless device's screen. In this embodiment, the sender 702 also displays the image on its screen. This is useful, for instance where the series of images represent a slideshow presentation, so that the sender knows where in the slideshow the recipients are. In the present embodiment, some period of time then passes. The sender 702 may then send a "DISP(tag T3)" message to the server for forwarding to each recipient 706, 708 and the associated image is displayed in a manner similar to how the "DISP(tag T2)" message was handled.

Figure 8:
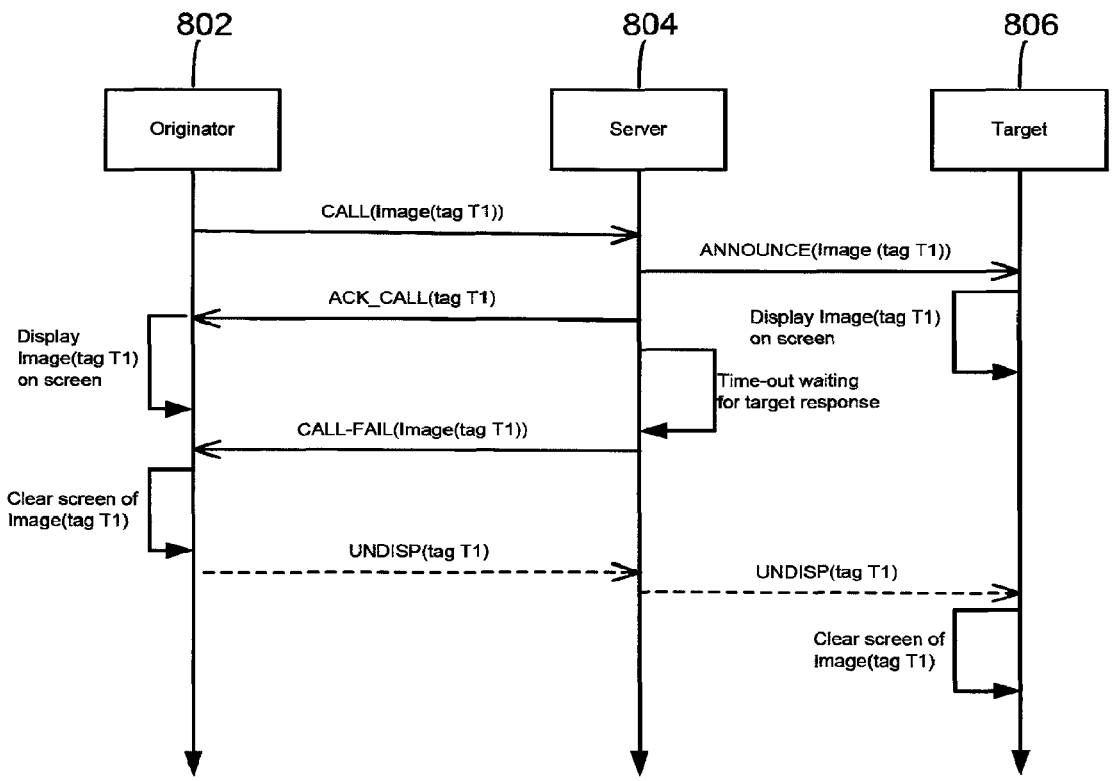
FIG. 8 is a call-flow diagram of one embodiment of the system comprising switching a displayed image when a voice call fails.

FIG. 8 is a call-flow diagram of one embodiment of the system comprising switching a displayed image when a voice call fails. Time proceeds from the top of the page towards the bottom of the page, so, for instance, the "CALL(Image(tag T1))" message (this format may be read to say "attempt to establish a call with recipient 806 and include a corresponding image media with unique tag 'T1'") is sent before the "ANNOUNCE(Image (tag T1))" message is sent. In other embodiments, some of these messages may be sent in a different order. For instance, in an embodiment, the server 804 may send the "ACK_CALL(tag T1)" message to the originator 802 before sending the "ANNOUNCE(Image(tag T1))" message to target 806.

A sender, or originator, 802 begins by sending a CALL (Image(tag T1)) message to a server 804 via the sender's wireless communications device. In an embodiment, each media comprises a separate message. In an embodiment, the message is sent across a data channel. In an embodiment, the server comprises a QCHAT™ server or a PDSN. This message represents a request to send media comprising an image to a recipient, or target 806. In an embodiment, each media message is tagged with a unique tag by the sender, so that the sender may later identify a particular media on the recipient's wireless device. The message includes tag "T1."

The server 804 then sends a corresponding "ANNOUNCE (Image (tag T1))" message to the target 806, informing the target 806 of the call attempt. The target then displays the image with tag "T1" on the screen of the recipient's wireless communications device, and the server sends an "ACK_CALL(tag T1)" message back to the sender 806 acknowledging that the original "CALL(Image (tag T1))" message was received by the server 804. In an embodiment, the sender's wireless device then displays the image associated with tag "T1" on its screen.

Figure 9:
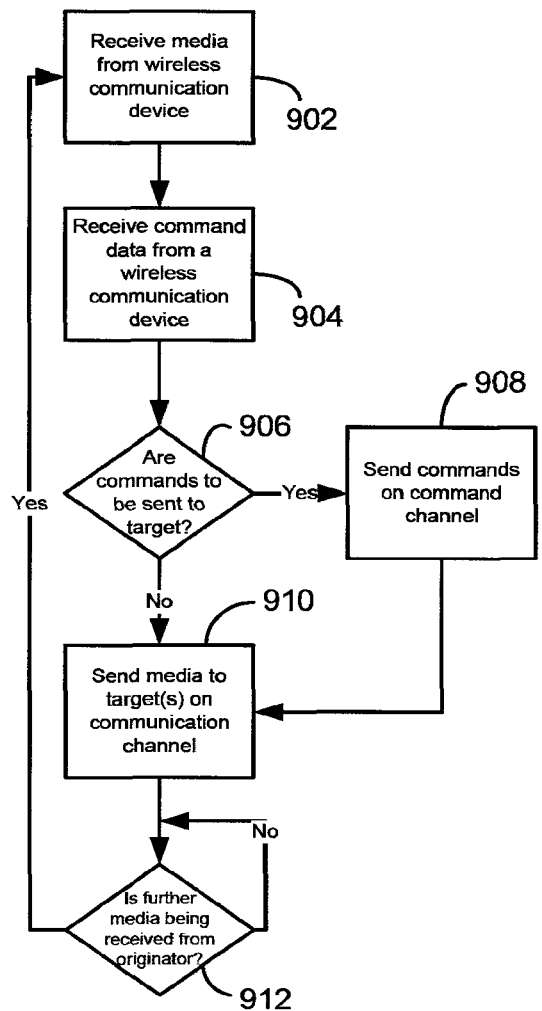
FIG. 9 is a flowchart of one embodiment of a group communication server sending commands for media handling in a separate communication channel from the media.

In the present call flow diagram, the server 804 has a limited period for which it will wait for the recipient 806 to accept the call, and it times out waiting for the recipient to respond. In response to this, the server 804 sends a "CALL-FAIL(Image (tag T1))" message to the sender 802, signifying that the attempted call failed. In response to that, the sender 802 clears its screen of the image associated with tag "T1" and sends an "UNDISP(tag T1)" message to the server 804, instructing the target 806 to perform a similar function. The server 804 passes this message on to the recipient 806, which clears its screen of the image associated with tag T1 in response to receiving the message. In one embodiment, the originator 804 sends "UNDISP(tag T1)" message based on FIG. 9 is a flowchart of one embodiment of a group communication sever 32 sending commands for media handling in a separate communication channel from the media. Media is received from a wireless communication device 14,16,18 to start the process, as shown at step 902, and then commands (if any) are also received along with the media, as shown at step 904. Then a determination is made as to whether any commands should be sent to the target wireless communication devices, as shown at decision 906. If no commands should be sent at decision 906, then the media is simply sent on to the one or more target wireless communication devices 14,16,18, as shown at step 910. Otherwise, if commands should be sent at decision 906, then the commands are sent to the target wireless communication device(s) via a command channel, as shown at step 908, then the media is sent as shown at step 910. The command channel can be a virtual channel in the same communication path as the media channel or in a different bandwidth channel, such as a control channel.

After the media is sent at step 910, then a determination is made as to whether further media is being received from a wireless communication device, as shown at decision 912. If no further media is being received at decision 912, then a wait state is entered in the process at decision 912. Otherwise, if further media is received at decision 912, the process iterates to begin at step 902 and receive the media.

Figure 10:
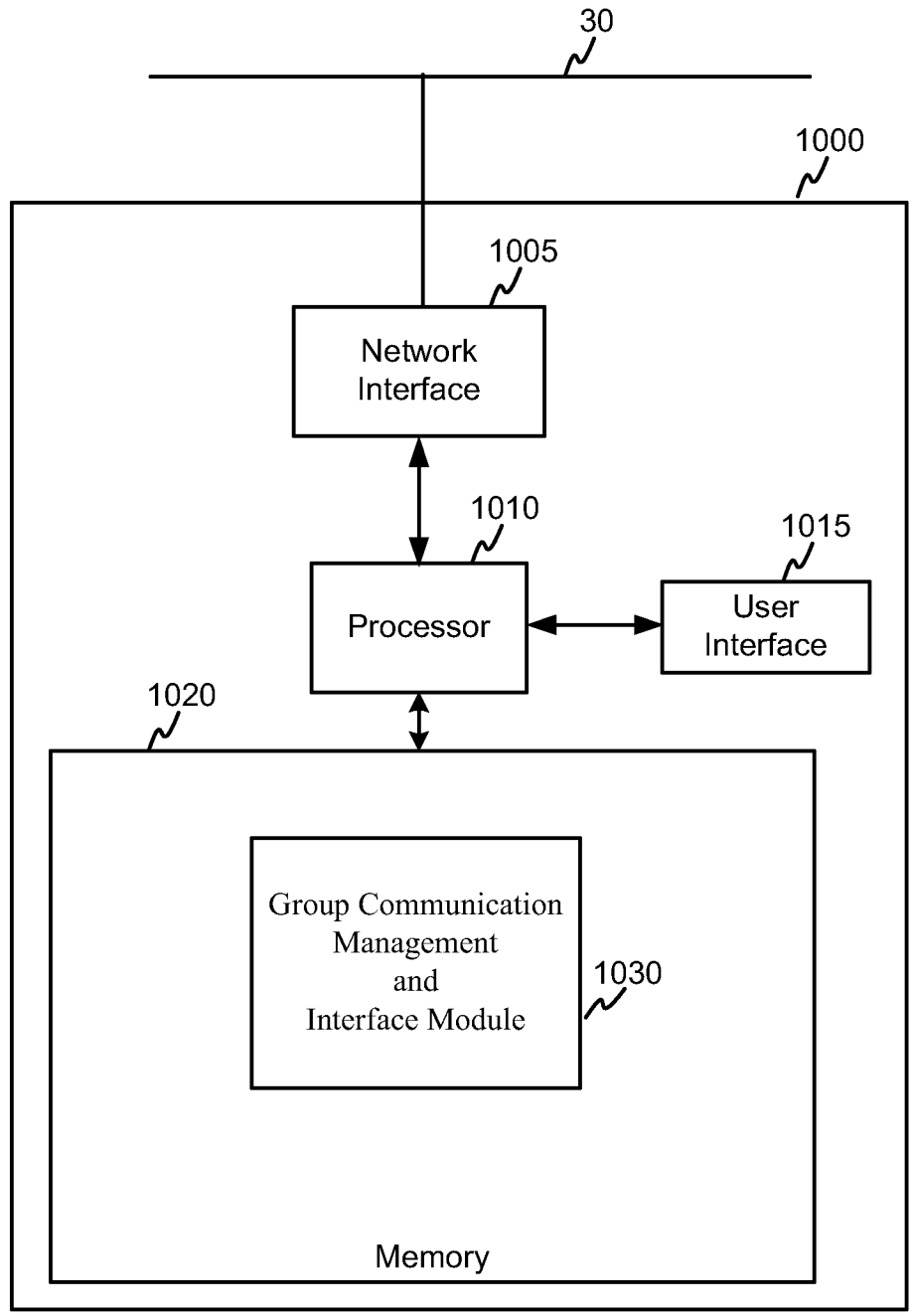
FIG. 10 is a block diagram showing an exemplary group communications server.

FIG. 10 is a block diagram showing an exemplary group communications server 1000. The group communications server 1000 may be a separate device which can be present on a server-side LAN 30, wherein its functionality is discussed above. For the sake of simplicity, the various features and functions illustrated in the block diagram of FIG. 10 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 10 may be further subdivided or two or more of the features or functions illustrated in FIG. 10 may be combined.

The group communications server 1000 may include a network interface 1005 that may be wired and/or wireless for communicating over the server side LAN 30. A processor 1010 may be connected to the network interface 1005, a user interface 1015 and memory 1020. The processor 1010 may include one or more microprocessors, microcontrollers, and/or digital signal processors that provide processing functions, as well as other calculation and control functionality. The processor 1010 accesses memory 1020 for reading/writing data and/or software instructions for executing programmed functionality. The memory 1020 may be on-board the processor 1010 (e.g., within the same IC package), and/or the memory may be external memory to the processor and functionally coupled over a data bus.

A number of software modules and/or data tables may reside in memory 1020 and be utilized by the processor 1010 for managing functionality, including functionality describe above in FIG. 9. As illustrated here, within memory 1020, the group communications server 1000 may further include or otherwise provide a group communication management and interface module 1030. While the software module 1030 is illustrated in the example as being contained in memory 1020, it should be recognized that in certain implementations such procedures may be provided for or otherwise operatively arranged using other or additional mechanisms. For example, all or part of software module 1030 may be provided in firmware. Additionally, while in FIG. 10 the software module 1030 is shown as a single distinct entity for ease of description, it should be understood that it may include a plurality of modules that are not illustrated, or otherwise be further partitioned into a differing groups of procedures.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for controlling the use of media across a wireless communications service. The method may include sending, to at least one wireless communications device, media across a data communications channel, and sending, to each wireless communications device, a command across a control communications channel comprising at least one instruction for the handling of the media by the wireless communication device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for controlling use of media across a wireless communications service, comprising:
    sending, to at least one wireless communications device of a plurality of wireless communications devices participating in a group communication session, the media across a data communications channel;
    sending, to each wireless communications device of the plurality of wireless communications devices participating in the group communication session, a command across a control communications channel comprising at least one instruction for handling the media by each wireless communications device of the plurality of wireless communications devices, wherein the command identifies the media received by at least one of the plurality of wireless communications devices before the at least one of the plurality of wireless communications devices received the command; and
    sending, to each wireless communications device of the plurality of wireless communications devices, audio across a voice channel while sending the media to the at least one wireless communications device of the plurality of wireless communications devices.

2. The method of claim 1, wherein the data communications channel and the control communications channel are logical channels that share a common communication path.

3. The method of claim 1, wherein the at least one instruction further comprises:
    an instruction for each wireless communications device of the plurality of wireless communications devices to handle the media at a same time.

4. The method of claim 3, wherein each wireless communications device of the plurality of wireless communications devices has set an internal clock from a time server and the at least one instruction for each wireless communications device of the plurality of wireless communications devices to handle the media at the same time includes:
an instruction to handle the media when the internal clock reaches a specified time.

5. The method of claim 1, wherein the at least one instruction for handling the media comprises at least one from a set comprising:
a time to begin presenting the media, a time to end presenting the media, an instruction to replace the media with a second media, an instruction to delete the media, an instruction to store the media, or an application to use to present the media.

6. The method of claim 5, wherein the time to begin presenting the media is one from a set comprising:
an absolute time or a relative time.

7. The method of claim 1, where the command further comprises an application to use to present the media.

8. The method of claim 1, wherein the media comprises at least one from a set comprising image, video or audio, wherein the at least one instruction comprises at least one instruction from a set comprising:
an instruction to display a specific image, an instruction to clear display of a specific image, an instruction to play the media in slow motion, an instruction to rewind the media, an instruction to fast-forward through the media, an instruction to loop a subset of the media, or an instruction to skip playing parts of the media.

9. The method of claim 1, wherein the media is stored on a server, and sending the media includes:
directing the server to send the media to each wireless communications device of the plurality of wireless communications devices.

10. The method of claim 1, further comprising:
sending, to each wireless communications device of the plurality of wireless communications devices, a request to initiate a call;
receiving, from at least one unanswering wireless communications device of the plurality of wireless communications devices, an indication that the call is declined;
sending, to the at least one unanswering wireless communications device, a second media across the data communications channel; and
sending, to the at least one unanswering wireless communications device, a second command across the control communications channel comprising at least one instruction for handling the second media.

11. The method of claim 1, wherein the at least one wireless communications device comprises a target wireless communications device and the command further comprises:
an instruction for only the target wireless communications device to process the at least one instruction for handling the media.

12. The method of claim 1, wherein the media comprises a payload, and a tag that uniquely identifies the payload.

13. The method of claim 1, wherein the data communications channel is a multicast channel.

14. The method of claim 1, wherein the control communications channel is a unicast channel.

15. The method of claim 1, further comprising:
sending the command after receiving an indication that the media was received by the at least one wireless communications device of the plurality of wireless communications devices.

16. The method of claim 15, wherein the indication comprises a time at which the media was received.

17. The method of claim 1, wherein the command comprises an instruction and a tag that identifies a specific media payload.

18. A method for controlling use of media across a wireless communications service, comprising:
receiving, by at least one wireless communications device of a plurality of wireless communications devices participating in a group communication session, the media across a data communications channel;
receiving, by the at least one wireless communications device, a command across a control communications channel comprising at least one instruction for handling the media by each of the plurality of wireless communications devices participating in the group communication session, wherein the command identifies the media received by the at least one wireless communications device before the at least one wireless communications device received the command;
handling, by the at least one wireless communications device, the media in accordance with the command; and
receiving a sound across a voice channel while receiving the media.

19. The method of claim 18, wherein the data communications channel and the control communications channel are logical channels.

20. The method of claim 18, wherein the data communications channel and the control communications channel share a single communication path.

21. The method of claim 18, wherein the plurality of wireless communications devices receive the command, wherein the at least one instruction comprises an instruction for each wireless communications device of the plurality of wireless communications devices to handle the media at a same time, and wherein the handling the media comprises:
handling the media at the same time as each other wireless communications device of the plurality of wireless communications devices handles the media.

22. The method of claim 21, wherein each of the plurality of wireless communications devices has set an internal clock from a time server and the instruction for each wireless communications device of the plurality of wireless communications devices to handle the media at the same time includes:
an instruction to handle the media when the internal clock reaches a specified time.

23. The method of claim 22, wherein the specified time is one from a set comprising:
an absolute time or a relative time.

24. The method of claim 18, wherein handling the media comprises at least one from a set comprising:
presenting the media at a time, ending presentation of the media at a time, replacing the media with a second media, deleting the media, storing the media, or presenting the media with an application.

25. The method of claim 18, wherein the command further comprises an application to handle the media.

26. The method of claim 18, wherein the media comprises at least one from a set comprising image, video or audio, wherein the at least one instruction comprises at least one instruction from a set comprising:
an instruction to display a specific image, an instruction to clear display of a specific image, an instruction to play the media in slow motion, an instruction to rewind the media, an instruction to fast-forward through the media, an instruction to loop a subset of the media, or an instruction to jump to a new part in the media.

27. The method of claim 18, further comprising:
receiving a request to initiate a phone call;
receiving a second media when the phone call is not initialized;
receiving at least one second instruction for handling the second media; and
handling the second media according to each second instruction.

28. The method of claim 18, wherein the method operates on a wireless device and the command comprises an instruction to handle the media according to the instruction when a device identifier of the command matches a device identifier of the wireless device.

29. A non-transitory computer-readable medium comprising instructions, which, when executed by at least one processor cause the at least one processor to control use of media across a wireless communications service, the instructions comprising:
at least one set of instructions to send, to at least one wireless communications device of a plurality of wireless communications devices participating in a group communication session, the media across a data communications channel;
at least one set of instructions to send, to each wireless communications device of the plurality of wireless communications devices participating in the group communication session, a command across a control communications channel comprising at least one instruction for handling the media, wherein the command identifies the media received by at least one of the plurality of wireless communications devices before the at least one of the plurality of wireless communications devices received the command; and
at least one set of instructions to send, to each wireless communications device of the plurality of wireless communications devices, audio across a voice channel while the media is being sent to the at least one wireless communications device of the plurality of wireless communications devices.

30. A system for controlling use of media across a wireless communications service, comprising:
a computer platform including a processor;
wherein the computer platform is configured to send, to at least one wireless communications device of a plurality of wireless communications devices participating in a group communication session, the media across a data communications channel from the processor;
wherein the computer platform is further configured to send, to each wireless communications device of the plurality of wireless communications devices participating in the group communication session, a command across a control communications channel from the processor comprising at least one instruction for handling the media by each wireless communications device of the plurality of wireless communications devices, wherein the command identifies the media received by at least one of the plurality of wireless communications devices before the at least one of the plurality of wireless communications devices received the command, and
wherein the computer platform is further configured to send, to each wireless communications device of the plurality of wireless communications devices, audio across a voice channel while the media is being sent to the at least one wireless communications device of the plurality of wireless communications devices.

31. The system of claim 30, wherein the data communications channel and the control communications channel are logical channels that share a common communication path.

32. The system of claim 30, wherein the at least one instruction further comprises:
an instruction for each wireless communications device of the plurality of wireless communications devices to handle the media at a same time.

33. The system of claim 30, wherein the at least one instruction further comprises:
an instruction for each wireless communications device of the plurality of wireless communications devices to handle the media on receipt without delay.

34. The system of claim 32, wherein each wireless communications device of the plurality of wireless communications devices has set an internal clock from a time server and the at least one instruction for each wireless communications device of the plurality of wireless communications devices to handle the media at the same time includes:
an instruction to handle the media when the internal clock reaches a specified time.

35. The system of claim 30, wherein the at least one instruction for handling the media comprises at least one from a set comprising:
a time to begin presentation of the media, a time to end presentation of the media, an instruction to replace the media with a second media, an instruction to delete the media, an instruction to store the media, or an application to use to present the media.

36. The system of claim 35, wherein the time to begin the presentation of the media is one from a set comprising:
an absolute time or a relative time.

37. The system of claim 30, where the command further comprises an application to use to present the media.

38. The system of claim 30, wherein the media comprises at least one from a set comprising image, video or audio, wherein the at least one instruction comprises at least one instruction from a set comprising:
an instruction to display a specific image, an instruction to clear display of a specific image, an instruction to play the media in slow motion, an instruction to rewind the media, an instruction to fast-forward through the media, an instruction to loop a subset of the media, or an instruction to skip playing parts of the media.

39. The system of claim 30, wherein the media is stored on a server, and the computer platform being configured to send the media further includes:
the computer platform being configured to direct the server to send the media to each wireless communications device of the plurality of wireless communications devices.

40. The system of claim 30, wherein:
the computer platform is further configured to send, to each wireless communications device of the plurality of wireless communications devices, a request to initiate a call;
the computer platform is further configured to receive, from at least one unanswering wireless communications device of the plurality of wireless communications devices, an indication that the call is declined;
the computer platform is further configured to send, to the at least one unanswering wireless communications device, a second media across the data communications channel; and
the computer platform is further configured to send, to the at least one unanswering wireless communications device, a second command across the control communications channel comprising at least one instruction for handling the second media.

41. The system of claim 30, wherein the at least one wireless communications device comprises a target wireless communications device and the command further comprises:
an instruction for only the target wireless communications device to process the at least one instruction for handling the media.

42. The system of claim 30, wherein the media comprises a payload and a tag that uniquely identifies the payload.

43. The system of claim 30, wherein the data communications channel is a multicast channel.

44. The system of claim 30, wherein the control communications channel is a unicast channel.

45. The system of claim 30, wherein the computer platform is further configured to send the command after reception of an indication that the media was received by the at least one wireless communications device of the plurality of wireless communications devices.

46. The system of claim 45, wherein the indication comprises a time at which the media was received.

47. A system for controlling use of media across a wireless communications service, comprising:
means for processing data;
means for sending, to at least one wireless communications device of a plurality of wireless communications devices participating in a group communication session, the media across a data communications channel from the means for processing data;
means for sending, to each wireless communications device of the plurality of wireless communications devices participating in the group communication session, a command across a control communications channel from the means for processing data comprising at least one instruction for handling the media, wherein the command identifies the media received by at least one of the plurality of wireless communications devices before the at least one of the plurality of wireless communications devices received the command; and
means for sending, to each wireless communications device of the plurality of wireless communications devices, audio across a voice channel while the media is being sent to the at least one wireless communications device of the plurality of wireless communications devices.

48. The system of claim 47, further comprising:
means for sending, to each wireless communications device of the plurality of wireless communications devices, a request to initiate a call;
means for receiving, from at least one unanswering wireless communications device of the plurality of wireless communications devices, an indication that the call is declined;
means for sending, to the at least one unanswering wireless communications device, a second media across the data communications channel; and
means for sending, to the at least one unanswering wireless communications device, a second command across the control communications channel comprising at least one instruction for handling the second media.

49. A system for controlling use of media across a wireless communications service, comprising:
a computer platform of at least one wireless communications device of a plurality of wireless communications devices, the computer platform including a processor;
wherein the computer platform is configured to receive the media for a group communication session among the plurality of wireless communications devices across a data communications channel, receive a command across a control communications channel comprising at least one instruction for handling the media by each of the plurality of wireless communications devices participating in the group communication session, and handle the media in accordance with the command, wherein the command identifies the media received by the at least one wireless communications device before the at least one wireless communications device received the command, and
wherein the computer platform is further configured to receive a sound across a voice channel while the media is being received.

50. The system of claim 49, wherein the data communications channel and the control communications channel are logical channels.

51. The system of claim 49, wherein the data communications channel and the control communications channel share a single communication path.

52. The system of claim 49, wherein a plurality of wireless devices receive the command, the at least one instruction comprises an instruction for each wireless device of the plurality of wireless communications devices to handle the media at a same time, and wherein the computer platform is further configured to handle the media at the same time as each other wireless device handles the media.

53. The system of claim 49, wherein the computer platform is configured to present the media at a time, end presentation of the media at a time, replace the media with a second media, delete the media, store the media, or present the media with an application.

54. The system of claim 49, wherein the media comprises at least one from a set comprising image, video or audio, wherein the at least one instruction comprises at least one instruction from a set comprising:
an instruction to display a specific image, an instruction to clear display of a specific image, an instruction to play the media in slow motion, an instruction to rewind the media, an instruction to fast-forward through the media, an instruction to loop a subset of the media, or an instruction to jump to a new part in the media.

55. The system of claim 49, wherein the computer platform is further configured to receive a request to initiate a phone call, receive a second media when the phone call is not initialized, receive at least one second instruction for handling the second media, and handle the second media according to each second instruction.

56. A non-transitory computer-readable medium comprising instructions, which, when executed by at least one processor of at least one wireless communications device of a plurality of wireless communications devices cause the at least one wireless communications device to perform functions defined by the instructions, the instructions comprising:
at least one set of instructions to cause the at least one wireless communications device to receive media for a group communication session among the plurality of wireless communications devices across a data communications channel;
at least one set of instructions to cause the at least one wireless communications device to receive a command across a control communications channel comprising at least one instruction for handling the media by each of the plurality of wireless communications devices participating in the group communication session, wherein the command identifies the media received by the at least one wireless communications device before the at least one wireless communications device received the command;

at least one set of instructions to cause the at least one wireless communications device to handle the media in accordance with the command; and at least one set of instructions to cause the at least one wireless communications device to receive a sound across a voice channel while the media is being received.

57. A system for controlling use of media across a wireless communications service at a wireless communications device of a plurality of wireless communications devices, comprising:

means for processing data;

means for receiving the media for a group communication session among the plurality of wireless communications devices across a data communications channel;

means for receiving a command across a control communications channel comprising at least one instruction for handling the media by each of the plurality of wireless communications devices participating in the group communication session, wherein the command identifies the media received by the wireless communications device before the wireless communications device received the command;

means for handling the media in accordance with the command; and means for receiving a sound across a voice channel while the media is being received.

58. The system of claim 57, further comprising:

means for receiving a request to initiate a phone call;

means for receiving a second media when the phone call is not initialized;

means for receiving at least one second instruction for handling the second media; and means for handling the second media according to each second instruction.

\* \* \* \* \*